Dec. 26, 1967  C. D. WILSON, JR  3,360,634
PORTABLE ELECTRIC HEATING APPARATUS
Filed Feb. 8, 1965
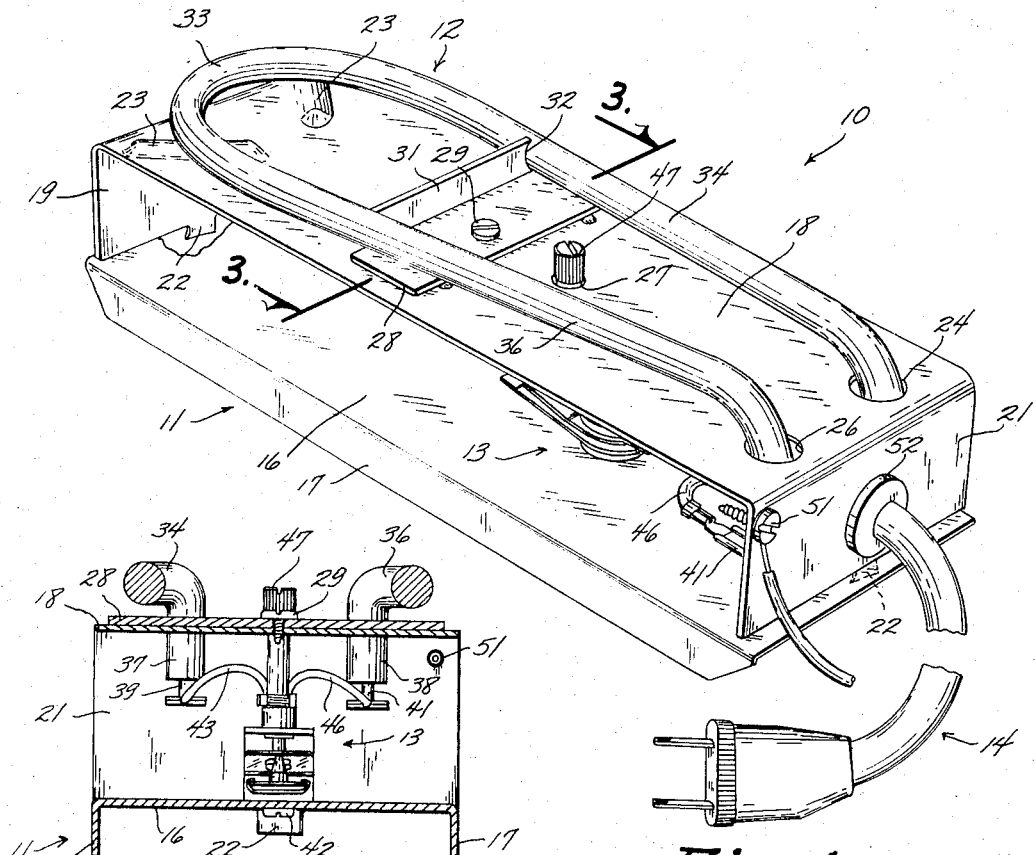
Fig. 1
Fig. 3
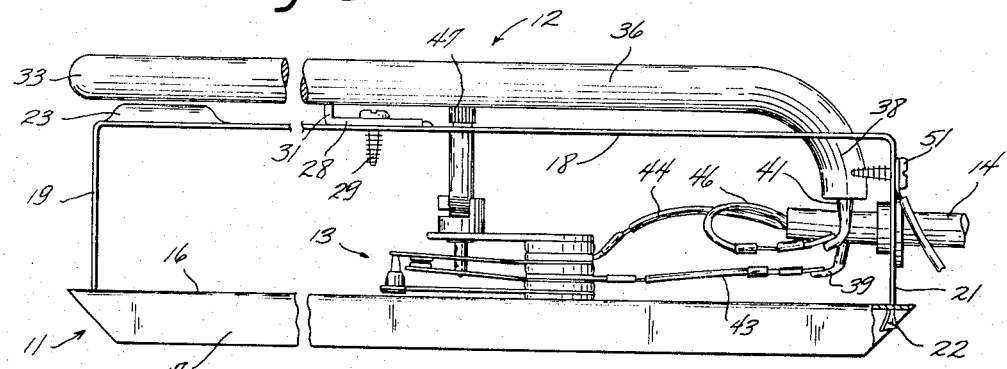
Fig. 2
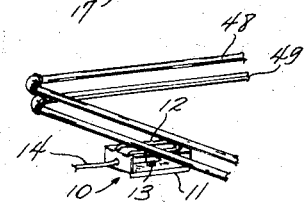
Fig. 4
INVENTOR
CLIFFORD D. WILSON, JR.
BY
Robert Henderson
ATTORNEY

United States Patent Office 3,360,634
Patented Dec. 26, 1967

3,360,634
PORTABLE ELECTRIC HEATING APPARATUS
Clifford D. Wilson, Jr., Conrad, Iowa 50621
Filed Feb. 8, 1965, Ser. No. 430,981
2 Claims. (Cl. 219—536)

ABSTRACT OF THE DISCLOSURE

This invention pertains to a small electric apparatus for contact or radiant heating purposes, the apparatus including a small metal base with a raised horizontally disposed portion thereabove having a Calrod-type heating element exposed above and mounted on the portion, for supporting that to be heated, for example, with the legs of the element depending straight downwardly below the portion for connection to a source of electricity. A thermostatic device for controlling the heating element is mounted on the base below the portion and has the upper manually adjustable end thereof exposed through an opening in the portion, but with the end below the surface of the element to obviate interference with any device mounted on or disposed above the heating element.

---

This invention relates to electric heating devices and particularly to a portable electric heater having the dual function of space heating and contact heating.

The present invention concerns itself particularly with the provision of a small, compact, and economical heating apparatus which may be easily carried about inside and outside, a heater which doubles as a radiation or a contact heat unit. The user can readily carry it about, set it to any temperature desired, within a broad available range, by a thermostat easily accessible from the top of the heater, place it substantially anywhere or even hang it up, and then walk away from it knowing it will function properly and safely.

It is, therefore, an object of this invention to provide an improved portable electric heater.

Another object of this invention is to provide a portable electric heater having a rod type heating element mounted in space relation above a base and capable of radiation heating and of contact heating.

Yet another object of this invention is to provide a portable electric heater having an exposed rod type heating element below which is supported a broad range thermostat, and with the thermostat being adjustable from overhead the heater.

Still another object is to provide a heater capable of attaining these objectives, which is economical to manufacture, simple and rugged in construction, and effective in use.

These objects, and other features and advantages of this invention will become readily apparent upon reference to the following description taken in conjunction with the accompanying drawings, wherein:

FIG. 1 is a perspective view of a preferred embodiment of the portable electric heater of this invention, with certain parts broken away for clarity of illustration;

FIG. 2 is a foreshortened, side elevational view of the heater of FIG. 1;

FIG. 3 is a sectional view taken along the line 3—3 in FIG. 1; and

FIG. 4 is a reduced perspective, fragmentary view showing one type of use for the heater.

Referring now to the drawings, the portable electric heater of this invention is indicated generally at 10 in FIGS. 1 and 4. Basically, the heater 10 comprises a ground engageable base unit 11, a rod type heating element 12 supported on top of the base unit 11, a thermostat device 13 (FIG. 2) mounted on the base unit below the thermostat device 13, and a weather resistant cord and plug unit 14 adapted for electric connection to a 115 volt AC source of electricity. The heater 10 is preferably fabricated of heavy galvanized steel, except for certain identifiable component parts.

More particularly, the base unit 11 (FIG. 1) comprises an elongated, substantially flat skid member 16 having a pair of depending side edge flanges 17 for ground or floor engagement. Spaced above the skid member 16 is a normally horizontally disposed, substantially flat panel 18 the ends 19 and 21 of which depend toward the skid member 16. A bayonet-type flange 22 is provided on each panel end 19 for insertion through openings provided therefor in the skid member 16, the flanges 22 then being twisted (FIG. 2).

At one end of the panel 18, a pair of blisters 23 are formed to aid in supporting the heating element 12. At the other end, a pair of transversely spaced openings 24 and 26 are provided, also for the heating element 12, and with a small aperture 27 formed in the panel 18 centrally thereof and intermediate the ends thereof. To support and hold the heating element, a bracket 28 (FIGS. 1 and 2) is provided.

The main part of the bracket 28 is flat for securement to the panel 18 by a metal screw 29, and with an upturned back spacer 31 the outer ends 32 (only one showing) of which are concavely formed to receive and hold the rounded heating element 12 in a nested manner.

The heating element 12 has a U-shape, with a rounded base 33, a pair of legs 34 and 36, and with a pair of downwardly extended ends 37 and 38, depending through the openings 24 and 26. The element itself is a commercially available calrod type, assembled in a manner well known so that its contained resistance wires course throughout its entire length, terminating at terminals 39 and 41 (FIG. 3). The length of the back spacer 31 is such that a slight amount of pressure is extended laterally against both heating element legs 34 and 36 to aid in retaining the element.

The thermostat device 13 is a conventional, commercially available, leaf contact type, mounted on the skid member 16 and below the panel by a metal screw 42 (FIG. 3). An electric lead 43 connects the thermostat 13 to one heating element terminal 39, and another lead 44 connects the thermostat 13 to the source cord and plug unit 14. The latter is electrically connected by a lead 46 to the other heating element terminal 41.

Importantly, an advantage of this heater 10 is the disposition of a turn screw 47 (FIGS. 1 and 2) upwardly through the panel aperture 27. In this position, the exposed screw 47 is confined within the protection of the base 33 and particularly the legs 34 and 36 of the heating element 12 and is disposed below the level of the element 12 so as not to be engaged by any conventional item placed upon the element 12. Furthermore, the adjusting screw 47 is readily available from overhead the heater 10.

In use for example, where the heater 10 (FIG. 4) is placed below and in contact with the lower one of a pair of water pipes 48 and 49, the adjusting screw 47 is available for overhead rotation to change the thermostat temperature setting. A ground wire attaching screw 51 (FIG. 1) is available for safety purposes, and the provision of a resilient grommet 52 for the cord and plug unit 14 is readily seen.

Maintenance of the heater 10 is simplicity at its utmost. Should the heating element 12 need replacing, after disconnecting the leads 43 and 46, removal of the screw 29 permits the bracket 28 and the heating element 12 to be lifted up and away from the panel 18, after which the legs 34 and 36, now free for lateral movement, can be separated to separate the element 12 from the bracket.

Reassembly is just the opposite. Should the thermostat device 13 need replacing, after removing the adjusting screw 47 and releasing the two leads 44 and 43, then removing the bottom screw 42, the device 13 is free for replacement.

Although a preferred embodiment of this invention has been disclosed and described herein, it is to be remembered that various modifications and alternate constructions can be made thereto without departing from the true spirit and scope of the invention as defined in the appended claims.

I claim:

1. A portable electric heating apparatus comprising in combination:

base means including a ground engageable member, and including a panel having a horizontally disposed portion extended over said member, the ends of said portion depending into engagement with said member so as to space said portion over said member;

a U-shaped rod type heating element having straight downwardly depending legs mounted on and above said portion in an exposed condition, the ends of the legs of said element depending through openings provided therefor in said portion wherein said element is liftable upwardly and away from said portion;

thermostat means mounted on said base means and detachably operatively connected to said heating element, said thermostat means including a temperature adjusting device extended upwardly through said portion and exposed between the legs of said heating element for overhead adjustment, said adjusting device disposed below the upper surface of said element; and electric source means electrically connected to said heating element and to said thermostat means.

2. A portable electric heating apparatus comprising in combination:

base means including a ground engageable member, and including further a panel having a normally horizontally disposed portion extended over said member, the ends of said portion depending into engagement with said member so as to space said portion over said member, said portion having an aperture formed therein;

a U-shaped rod type heating element mounted on and exposed above said panel so as to embrace said aperture;

thermostat means mounted on said portion and electrically connected to said heating element, said thermostat means including a temperature adjusting device extended upwardly through said aperture for overhead adjustment, said adjusting device disposed below the upper surface of said element; and electric source means electrically connected to said heating element and to said thermostat means.

References Cited

UNITED STATES PATENTS

| | | | |
|---|---|---|---|
| 1,652,745 | 12/1927 | Tannenbaum et al. | 219—459 |
| 2,296,591 | 9/1942 | Barnes | 219—252 |
| 2,385,606 | 9/1945 | Campbell | 219—252 |
| 2,612,586 | 9/1952 | Berarducci et al. | 219—228 |
| 2,632,087 | 3/1953 | D'Hartingue | 219—228 |
| 2,680,188 | 6/1954 | Stephens | 219—228 |
| 2,877,332 | 3/1959 | Senior | 219—536 |
| 3,046,381 | 7/1962 | Olswang | 219—270 |

RICHARD M. WOOD, *Primary Examiner.*

VOLODYMYR Y. MAYEWSKY, *Examiner.*